United States Patent
Lum et al.

(10) Patent No.: US 7,753,788 B2
(45) Date of Patent: Jul. 13, 2010

(54) GAME CONTROLLER THAT CONVERTS BETWEEN WIRELESS OPERATION AND WIRED OPERATION

(75) Inventors: Richard S. Lum, Redmond, WA (US); Wei Guo, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1329 days.

(21) Appl. No.: 10/769,431

(22) Filed: Jan. 30, 2004

(65) Prior Publication Data

US 2005/0170889 A1    Aug. 4, 2005

(51) Int. Cl.
*A63F 13/02* (2006.01)
*H04J 1/16* (2006.01)
*H04W 84/22* (2009.01)

(52) U.S. Cl. .................. 463/39; 463/29; 455/557; 370/252

(58) Field of Classification Search ............. 463/39, 463/29; 345/169; 370/252; 455/557
See application file for complete search history.

(56) References Cited

U.S. PATENT DOCUMENTS

| | | | | |
|---|---|---|---|---|
| 5,983,073 A * | 11/1999 | Ditzik | ............. | 455/11.1 |
| 6,078,789 A * | 6/2000 | Bodenmann et al. | ........ | 455/41.2 |
| 6,084,638 A * | 7/2000 | Hare et al. | ............. | 348/552 |
| 6,151,645 A * | 11/2000 | Young et al. | ............. | 710/63 |
| 6,169,789 B1 * | 1/2001 | Rao et al. | ............. | 379/110.01 |
| 6,195,712 B1 * | 2/2001 | Pawlowski et al. | ......... | 710/19 |
| 6,211,862 B1 * | 4/2001 | Park et al. | ............. | 345/169 |
| 6,304,250 B1 * | 10/2001 | Yang et al. | ............. | 345/168 |
| 6,317,061 B1 * | 11/2001 | Batra et al. | ............. | 341/22 |
| 6,404,393 B1 * | 6/2002 | Nelson et al. | ............. | 343/702 |
| 6,468,160 B2 | 10/2002 | Eliott | | |
| 6,480,587 B1 * | 11/2002 | Rao et al. | ............. | 379/110.01 |
| 6,511,378 B1 | 1/2003 | Bhatt et al. | | |
| 6,712,704 B2 | 3/2004 | Eliott | | |
| 6,719,633 B1 * | 4/2004 | Leifer et al. | ............. | 463/39 |
| 6,769,989 B2 | 8/2004 | Smith et al. | | |
| 2002/0105229 A1 | 8/2002 | Tanaka et al. | | |
| 2002/0107071 A1 | 8/2002 | Himoto et al. | | |
| 2003/0142631 A1 * | 7/2003 | Silvester | ............. | 370/252 |
| 2004/0122649 A1 * | 6/2004 | Bartek et al. | ............. | 703/23 |
| 2004/0162137 A1 | 8/2004 | Eliott | | |
| 2005/0096086 A1 * | 5/2005 | Singamsetty | ............. | 455/557 |

FOREIGN PATENT DOCUMENTS

WO    WO 2005/043333    12/2005

* cited by examiner

*Primary Examiner*—Peter DungBa Vo
*Assistant Examiner*—Frank M Leiva
(74) *Attorney, Agent, or Firm*—Lee & Hayes, PLLC

(57) ABSTRACT

A game controller operates in both a wired mode and a wireless mode, and is able to switch between these two modes without permanent disruption to an ongoing game. During a transition from one mode to another, a host gaming system detects when the controller is physically disconnected (for wired mode to wireless mode) or connected (for wireless mode to wired mode). Upon detection, the host gaming system stores the game data and user information and the game controller stores an identifier in its nonvolatile memory. The host gaming system and game controller then establish a new communication link. The game controller retrieves the identifier and submits it to the host gaming system, which uses the identifier to reassociate the game data and user information with the game controller as it begins operating in the new mode. This allows the player to continue game play without interruption.

8 Claims, 5 Drawing Sheets

GAME CONTROLLER THAT CONVERTS BETWEEN WIRELESS OPERATION AND WIRED OPERATION

TECHNICAL FIELD

This invention relates to peripherals for controlling video games, and more particularly, to game controllers that can be used for both wired and wireless play.

BACKGROUND

Game controllers facilitate user interaction with video games. Game controllers come in many configurations depending upon the desired gaming environment for which the controllers are to be used. There are multi-purpose controllers with one or more multi-function actuators for controlling a wide range of games and specialty controllers designed for specific genre of games, such as steering wheels for racing games, weapons for shooting games, and navigation sticks for aviation games.

Game controllers are designed to connect with the game hosting system using either wireless or wired technologies. For example, wired controllers for PC-based games typically connect to the PC via a serial port, such as a USB port, and wired controllers for console-based gaming systems might use a proprietary interface. Wireless controllers are designed using such technologies as infrared, RF, or Bluetooth.

SUMMARY

A game controller operates in both a wired mode and a wireless mode, and is able to switch between these two modes without permanent disruption to an ongoing game. During a transition from one mode to another, a host gaming system detects when the controller is physically disconnected (for wired mode to wireless mode) or connected (for wireless mode to wired mode). Upon detection, the host gaming system stores the game data and user information and establishes a new communication link with the controller. The host gaming system subsequently reassociates the game data and user information with the game controller as it begins operating in the new mode. This allows the player to continue game play without interruption.

BRIEF DESCRIPTION OF THE CONTENTS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

The following disclosure describes a game controller that can be operated in both a wired mode and a wireless mode. The game controller can switch easily between the two modes without disrupting continued play of the game. For discussion purposes, the game controller is described in the context of a multi-purpose game controller for a console-based gaming system. However, the game controller may be configured in many different ways and with a wide variety of functionality, including specialty controllers.

Gaming System

Figure 1:
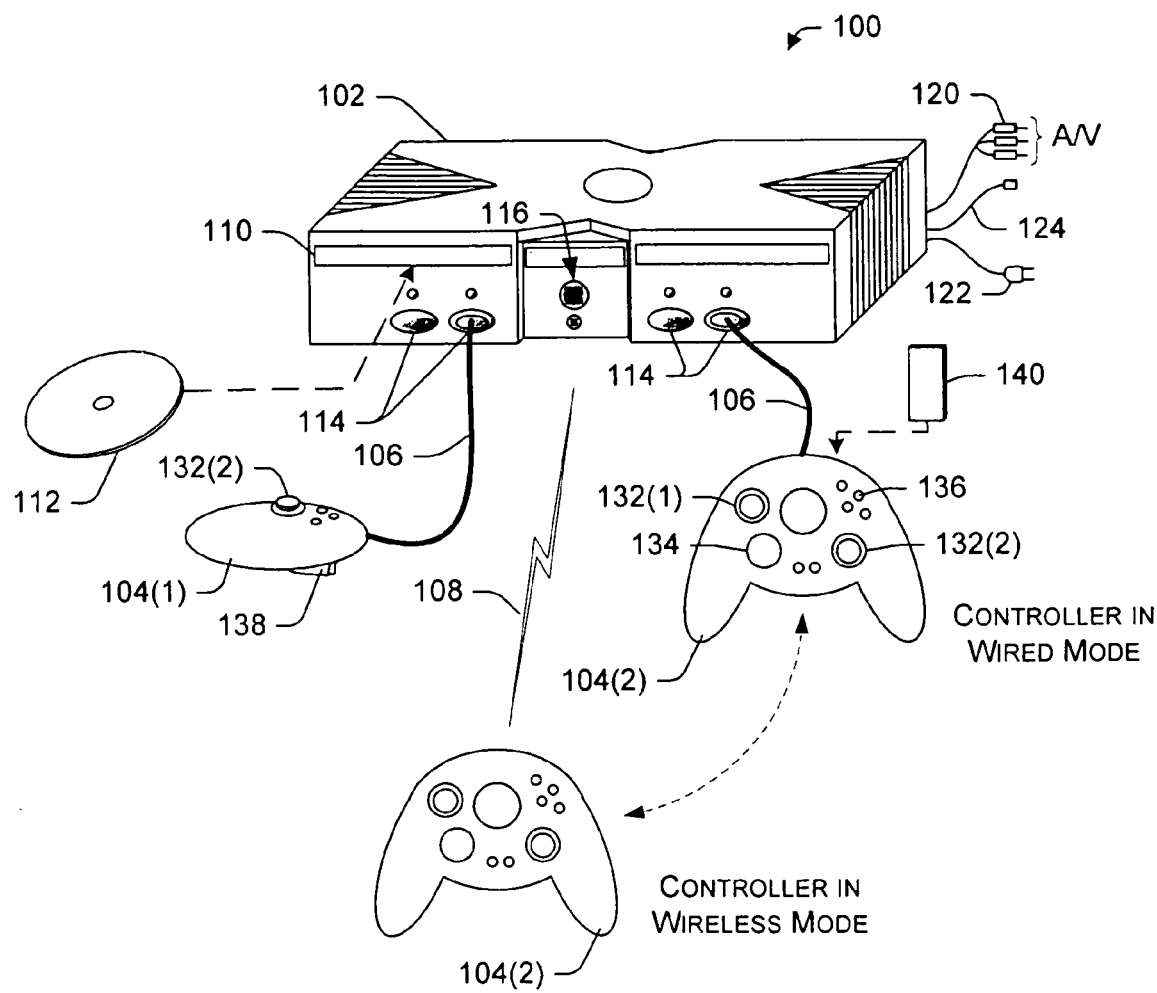
FIG. 1 illustrates a gaming system with a game console and a controller that can operate in both wireless and wired modes.

FIG. 1 shows an exemplary console-based gaming system 100. It includes a game console 102 and up to four controllers, as represented by two controllers 104(1) and 104(2). Each controller 104 is coupled to the game console 102 via a wire or wireless interface and utilizes a suitable data protocol, such as USB (Universal Serial Bus). One controller 104(2) is illustrated as operating in two different modes: a wired mode and a wireless mode. In the wired mode, the controller 104(2) is connected to the game console 102 via a cable 106. The controller derives power from the game console through the cable 106. In the wireless mode, the controller 104(2) is connected to the game console 102 via a wireless link 108. The wireless link may be implemented using any one of many different technologies including, for example, infrared, Bluetooth, or RF technologies. In the wireless mode, the controller 104(2) draws from its own power source, such as a battery. The cable 106 may optionally be detached from the controller to offer more freedom of movement.

The player can switch between wireless operation and wired operation by connecting the serial cable 106 to, or disconnecting it from, the game console 102. Mode-switching may occur during game play without interrupting the game. For example, if a game controller is in wireless mode and the battery runs low during game play, the player may switch to wired mode by plugging the cable 106 into the game console 102 and game play continues without interruption. While in wired mode, the game controller is powered by the game console and the controller battery is recharged.

The game console 102 is equipped with a portable media drive 110 and an optional internal hard disk drive. The portable media drive supports various forms of portable storage media as represented by an optical storage disc 112. Examples of suitable portable storage media include DVD, CD-ROM, game discs, game cartridges, and so forth.

The game console 102 has four slots 114 on its front face to support up to four controllers, although the number and arrangement of slots may be modified. In the wired mode, the game controllers 104 are assigned to the physical slots 114 for controlling various characters/features of the video game. In wireless mode, however, the game controllers 104(1)-104(4) are assigned to virtual slots.

In one implementation, virtual slots are assigned, without prompting the user, in sequential order to reduce complexity for the user. Thus, the first virtual slot is assigned to the first wireless game controller introduced to the host game console 102; the second virtual slot is assigned to the second wireless game controller, and so on. Alternatively, the user can choose a virtual slot via a user interface presented on the display. Actuation of a pre-designated button on the console invokes a slot assignment pane from which the player can select an available virtual slot.

Control buttons 116 are positioned on the front face of the game console 102. Control buttons 116 include, for example, a power button that switches power to the game console and an eject button that alternately opens and closes a tray of the portable media drive 110 to allow insertion and extraction of the storage disc 112.

The game console 102 connects to a television or other display (not shown) via A/V interfacing cables 120. A power cable 122 provides power to the game console. The game console 102 may be further equipped with internal or externally added network capabilities, as represented by the cable or modem connector 124 to facilitate access to a network, such as a local area network (LAN) or the Internet.

Each controller 104 may be equipped with any of a wide variety of user interaction mechanisms. As illustrated in FIG. 1, each controller 104 is equipped with two thumbsticks 132(1) and 132(2), a directional or D-pad 134, surface buttons 136, and two triggers 138. These mechanisms are merely representative, and other known gaming mechanisms (e.g., shoulder buttons) may be substituted for or added to those shown in FIG. 1.

A memory unit (MU) 140 may be inserted into the controller 104 to provide additional and portable storage (as illustrated) or alternatively into the game console 102. Portable memory units enable users to store game parameters and transport them for play on other consoles. In the illustrated implementation, each controller is configured to accommodate two memory units 140, although more or less than two units may be employed in other implementations. In other implementations, the game console may support one or more memory units per player.

Figure 2:
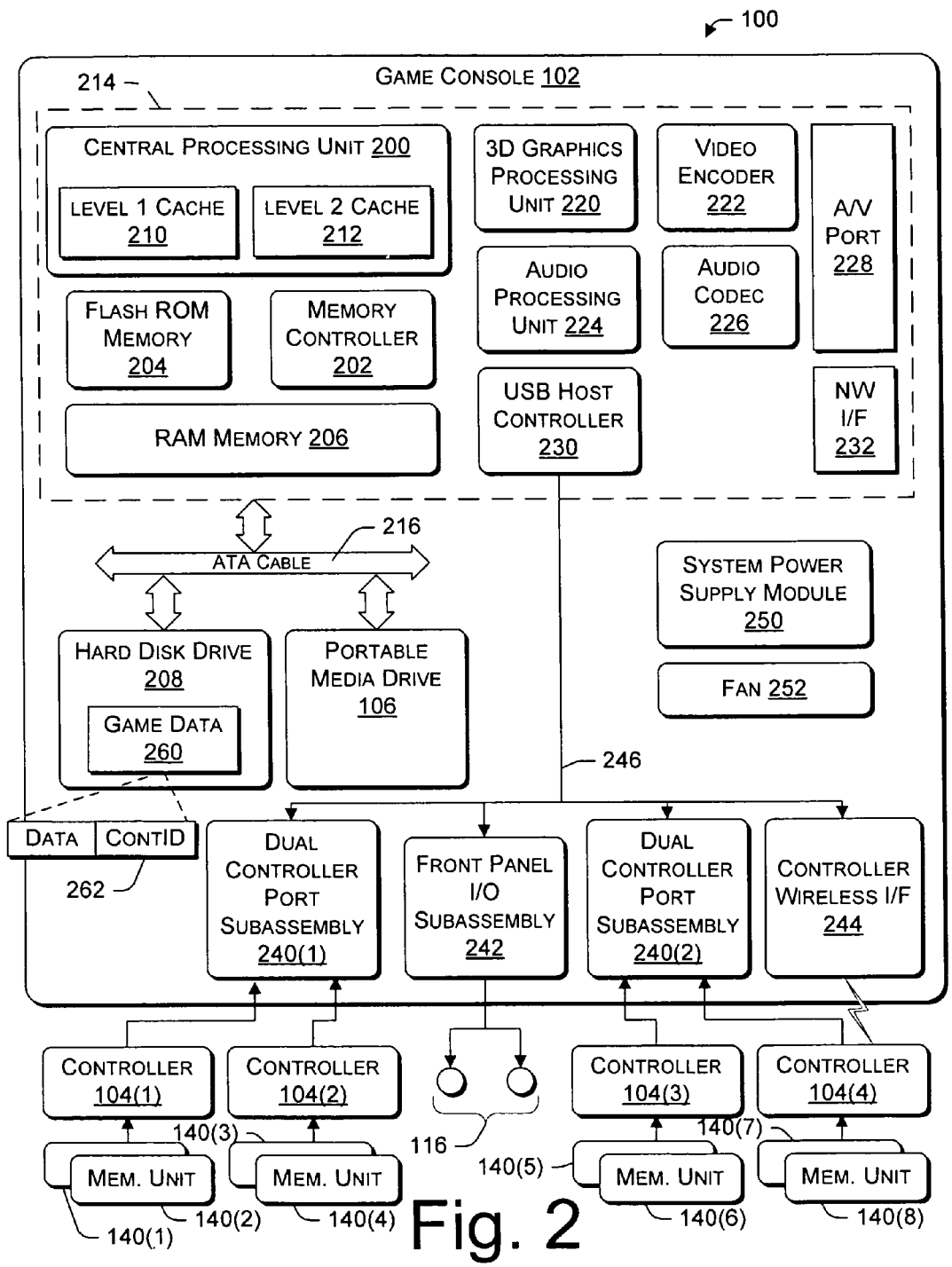
FIG. 2 is a block diagram of the gaming system.

FIG. 2 shows functional components of the gaming system 100 in more detail. The game console 102 has a central processing unit (CPU) 200 and a memory controller 202 that facilitates processor access to various types of memory, including a flash ROM (Read Only Memory) 204, a RAM (Random Access Memory) 206, a hard disk drive 208, and the portable media drive 106. The CPU 200 is equipped with a level 1 cache 210 and a level 2 cache 212 to temporarily store data and hence reduce the number of memory access cycles, thereby improving processing speed and throughput.

The CPU 200, memory controller 202, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus.

As one suitable implementation, the CPU 200, memory controller 202, ROM 204, and RAM 206 are integrated onto a common module 214. ROM 204 is configured as a flash ROM that is connected to the memory controller 202 via a PCI (Peripheral Component Interconnect) bus and a ROM bus (neither of which are shown). RAM 206 is configured as multiple DDR SDRAM (Double Data Rate Synchronous Dynamic RAM) modules that are independently controlled by the memory controller 202 via separate buses (not shown). The hard disk drive 208 and portable media drive 106 are connected to the memory controller via the PCI bus and an ATA (AT Attachment) bus 216.

A 3D graphics processing unit 220 and a video encoder 222 form a video processing pipeline for high speed and high resolution graphics processing. Data is carried from the graphics processing unit 220 to the video encoder 222 via a digital video bus (not shown). An audio processing unit 224 and an audio codec (coder/decoder) 226 form a corresponding audio processing pipeline with high fidelity and stereo processing. Audio data is carried between the audio processing unit 224 and the audio codec 226 via a communication link (not shown). The video and audio processing pipelines output data to an A/V (audio/video) port 228 for transmission to the television or other display. In the illustrated implementation, the video and audio processing components 220-228 are mounted on the module 214.

Also implemented on the module 214 are a USB host controller 230 and a network interface 232. The USB host controller 230 is coupled to the CPU 200 and the memory controller 202 via a bus (e.g., PCI bus) and serves as host for the peripheral controllers 104(1)-104(4). The network interface 232 provides access to a network (e.g., LAN, Internet, etc.) and may be any of a wide variety of various wired or wireless interface components including an Ethernet card, a modem, a Bluetooth module, a cable modem, and the like.

The game console 102 has two dual controller support subassemblies 240(1) and 240(2), with each subassembly supporting up to two of the game controllers 104(1)-104(4). A front panel I/O subassembly 242 supports the functionality of the control buttons 116, as well as any LEDs (light emitting diodes) or other indicators exposed on the outer surface of the game console. A controller wireless interface 244 is also provided to support wireless communication with the game controllers. The wireless interface 244 may use any one of many technologies, including IR, Bluetooth, and RF technologies. The subassemblies 240(1), 240(2), and 242 and controller wireless interface 244 are coupled to the module 214, and particularly the USB controller 230, via one or more cable assemblies 246.

Eight memory units 140(1)-140(8) are illustrated as being connectable to the four controllers 104(1)-104(4), i.e., two memory units for each controller. Each memory unit 140 offers additional storage on which games, game parameters, and other data may be stored. When inserted into a controller, the memory unit 140 can be accessed by the memory controller 202. It is noted that, in other implementations, the memory units 140 may be inserted into compatible slots in the game console 102.

A system power supply module 250 provides power to the components of the gaming system 100 and to the game controllers 104 when operating in the wired mode. A fan 252 cools the circuitry within the game console 102.

The game console 102 may further implement a cryptography engine to perform common cryptographic functions, such as encryption, decryption, authentication, digital signing, hashing, and the like. The cryptography engine may be implemented as part of the CPU 200, or in software stored in memory (e.g., ROM 204, hard disk drive 208) that executes on the CPU, so that the CPU is configured to perform the cryptographic functions.

Game data 260 generated during game play is stored in memory at the game console, such as in hard disk drive 208 (although other storage may be used). The type and quantity of game data is game specific and can be essentially anything that a game developer would like to track. Examples of game data might include skid marks or fuel level in a racing game, weapon selection or life count in shooter games, and so forth.

The game data 260 is stored in relation to a controller ID 262. When a player switches between wired and wireless mode of operation, the controller passes in the controller ID and the console tries to match it with any controller IDs stored on hard disk drive 208 in relation to saved game data 260. If a match is found, the game console reassociates the corresponding game data with the controller.

Figure 3:
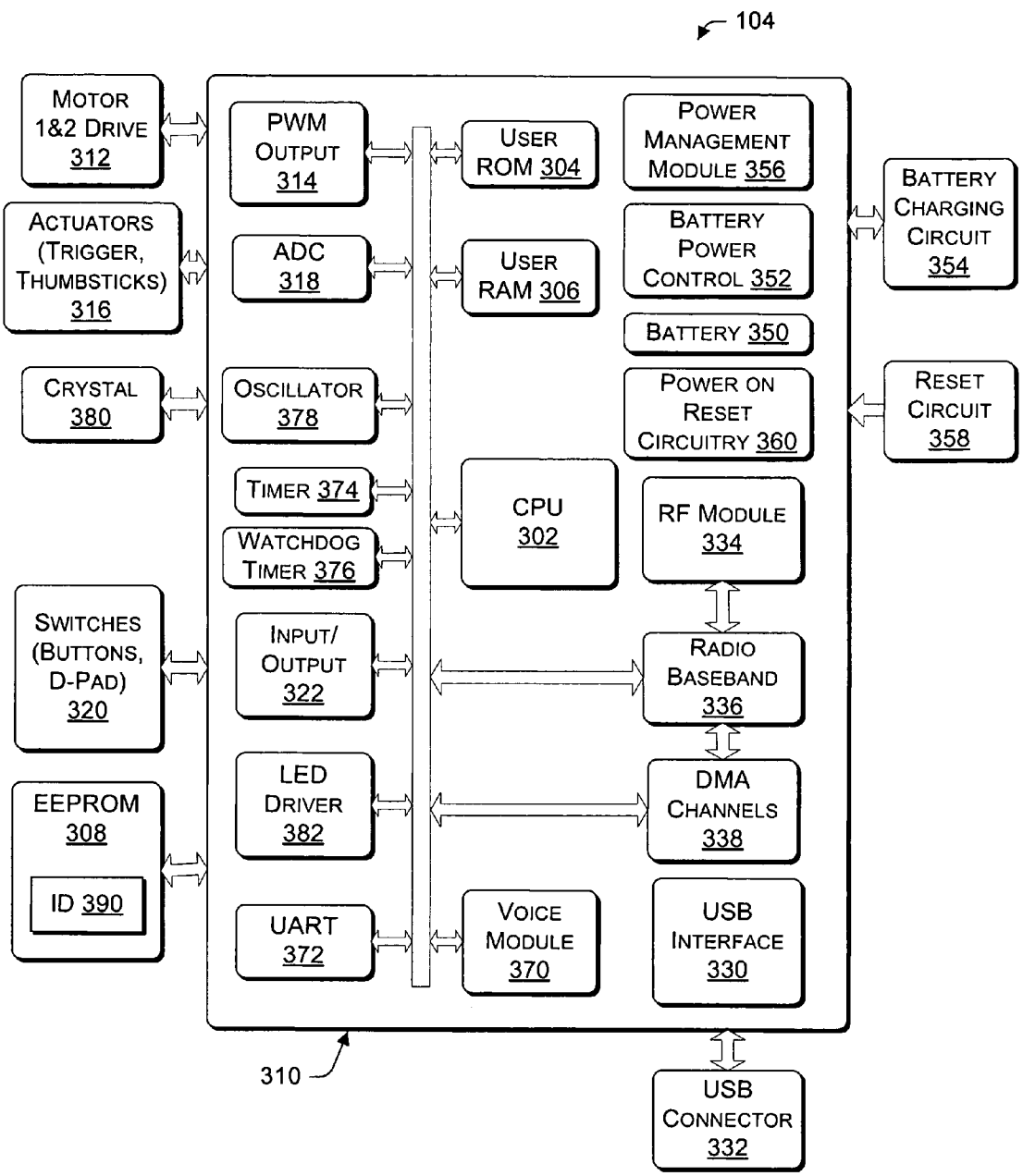
FIG. 3 is a block diagram of the controller.

FIG. 3 shows functional components of the game controller 104 in more detail. The controller 104 has a central processing unit (CPU) 302 and memory, including ROM 304, RAM 306 and EEPROM 308. In the illustrated implementation, the CPU 302, ROM 304, and RAM 306 are integrated onto a common module 310 and are interconnected via one or more bussing structures. EEPROM 308 is separate from, but interfaced with, the module 310.

The game controller 104 further includes motor drives 312 to provide tactile feedback to the player and a PWM (pulse width modulation) output 314 to provide the control signals for the motor drives. Player actions received via variable-input actuators 316 (e.g., thumbsticks 132 and triggers 138) are converted by analog-to-digital converter (ADC) 318 to provide player input to the CPU 302. ADC 318 can be implemented, for example, as an eight channel 10-bit or 12-bit converter. Other player actions received through dual-state switches 320 (e.g., buttons 136 and D-pad 134) are passed through I/O 322 to CPU 302.

As noted above, the game controller 104 supports both wired operation and wireless operation. The game controller 104 includes a USB interface 330 and USB connector 332 for the wired mode of operation. In the illustrated implementation, the game controller 104 is configured to support wireless operation using RF (radio frequency) technologies. An RF module 334 (e.g., 2.4 GHz RF module), a radio baseband unit 336, and DMA (Direct Memory Access) channels unit 338 support the wireless mode of operation. In other implementations, the game controller can be designed to utilize alternative wireless technologies, such as IR (infrared), Bluetooth, UWB (UltraWide Band), and so forth.

The game controller 104 is equipped with its own power source to enable wireless operation. In the illustrated implementation, a battery 350 supplies power to the electronic modules and components of the game controller 104. A battery power controller 352 monitors the battery 350 and detects when power is low. Upon detection, a low power condition can be conveyed to the player (e.g., illumination of a light indicator on the controller or display of a warning while the game is being played). The player can then switch to wired mode by plugging in the cable to the game console. The battery power controller 352 also monitors charging behavior of the battery, such as how long it takes to charge and detection of when it is fully charged. In wired mode, the game controller 104 receives power from the game console. A battery charging circuit 354 recharges battery 350 while the controller is connected via the cable. A reset circuit 358 and power on reset circuitry 360 allow the game controller to be reset during operation or when power is initially provided. A power management module 356 generates voltages for the different components on the module 310 and dynamically manages power consumption of those components.

As part of the power management, the console maintains battery life data including, for example, the total life expectancy of the battery, how much power has been drawn during wireless play, and the amount of time left before the battery supply is effectively depleted. The controller sends the battery life data to the console and the console can utilize the data to instruct the player when to switch from wireless play to wired play so that the controller can be recharged. For instance, the console may flash a warning light on the console or present a pop up message on the display to inform the player of low battery conditions and suggest that the player plug the controller cable into the console for continued play.

A voice module 370 may be optionally included in the game controller 104 to receive oral commands or speech from the player. The game controller 104 also has timing components to provide timing functionality, including a general purpose timer 374 (e.g., 16-bit timer), a watchdog timer 376, an oscillator 378, and a crystal 380.

One or more identifiers 390 are stored in EEPROM 308. In particular, the EEPROM 308 stores a session ID that is used to facilitate switching between wired mode and wireless mode without causing permanent disruption to game play. The session ID includes an active game ID that identifies the current virtual slot being used by the controller and a device ID that identifies the controller itself. After a mode transition occurs (i.e., from wired mode to wireless mode, or vice versa) and a new connection is established, the game controller 104 passes the session ID to the game console. The game console extracts the controller ID portion and looks to match it with any controller ID stored on the game console in relation to saved game data. If a match is found, the game console reassociates the corresponding game data with the controller. In this manner, game play can continue uninterrupted during transition from wireless mode to wired mode.

Mode Switching Operation

Figure 4:
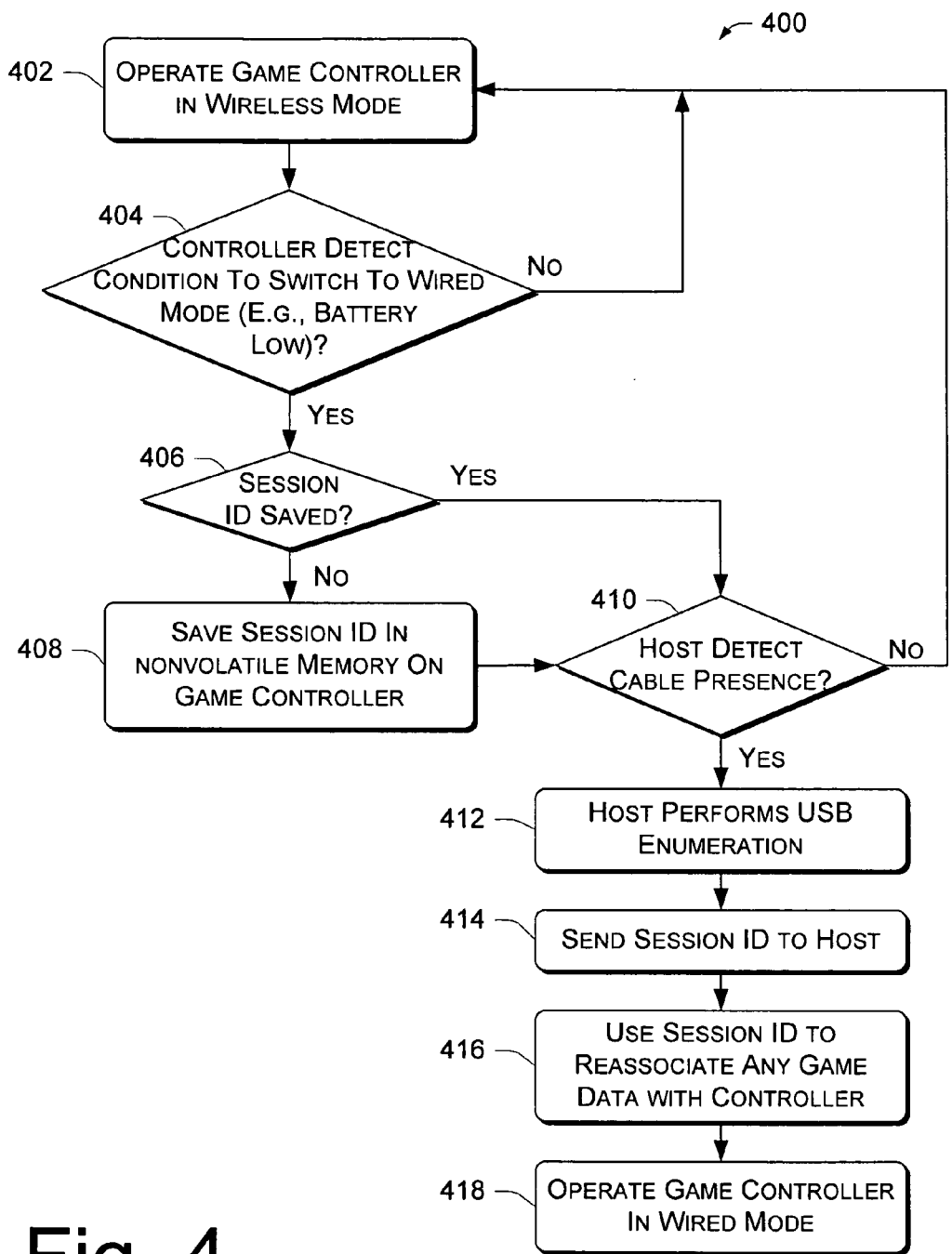
FIG. 4 is a flow diagram showing a process for converting use of the controller from wireless operation to wired operation.

FIG. 4 shows a process 400 for switching a game controller from a wireless mode of operation to a wired mode of operation. The process 400 is illustrated as a collection of blocks in a logical flow graph, which represent a sequence of operations that can be implemented in hardware, software, or a combination thereof. In the context of software, the blocks represent computer instructions that, when executed by one or more processors, perform the recited operations.

The process includes operations performed by both the game controller and a host gaming system. For discussion purposes, the process 400 is described with reference to the controller 104 and game console 102 described above with respect to FIGS. 1-3. It is noted that the process 400 may be implemented by other types of controllers that are designed for both wired and wireless communication, and for other types of gaming systems, such as PCs.

At block 402, the game controller 104 is operated in a wireless mode. In this mode, the game controller 104 draws power from the battery 350 and transmits user commands via the RF module 334 to the game console 104. During operation in wireless mode, the game controller 104 monitors for conditions that might suggest a switch in operation from wireless mode to wired mode (block 404). One example of a condition is where battery power controller 352 detects that battery 350 is running low. Another example condition occurs when a number of packets are lost or otherwise contain incorrect data during the wireless exchange between the controller 104 and console 102, perhaps due to a noisy RF environment or other interference. If no such conditions arise (i.e., the "No" branch from block 404), the game controller remains in wireless mode.

When a transition condition is detected (i.e., the "Yes" branch from block 404), the game controller 104 determines whether the session ID is saved in memory resident at the controller (block 406). The session ID includes an active game ID that identifies the current virtual slot being used by the controller and a device ID that identifies the controller. If the session ID is not saved (i.e., the "No" branch from block 406), the game controller 104 saves the session ID in nonvolatile memory resident at the controller, such as EEPROM 308 (block 408).

Once the session ID is saved on the controller, the host (e.g., game console 102) determines whether the cable 106 is connected to one of the physical slots 114 (block 410). If not (i.e., the "No" branch from block 410), the game controller 104 continues to be operated in wireless mode. It may continue in this mode until the cable is attached or the battery ceases to supply sufficient power. When the cable is connected (i.e., the "Yes" branch from block 410), the game console 102 performs USB enumeration to establish a USB connection via the cable 106 (block 412).

Once the connection is established, the game controller 104 retrieves the session ID from nonvolatile memory and sends it to the game console (block 414). The game console uses the session ID to locate any saved game data and reassociates that game data with the controller (block 416). More particularly, as game data 260 is generated during play, it is stored at the game console 102 in relation to a controller ID 262 associated with the game controller. The controller ID may be unique to the controller itself or it may represent a connection slot currently being used by the controller. When a mode transition occurs (i.e., from wired mode to wireless mode, or vice versa), the game console uses the controller ID from the session ID received from the newly attached game controller and looks to match it with any controller ID stored on the game console. If a match is found, the game console reassociates the game data for the active game identified in the session ID with the controller. In this manner, game play can continue uninterrupted during transition from wireless mode to wired mode. At block 418, the game controller 104 continues in wired mode.

Figure 5:
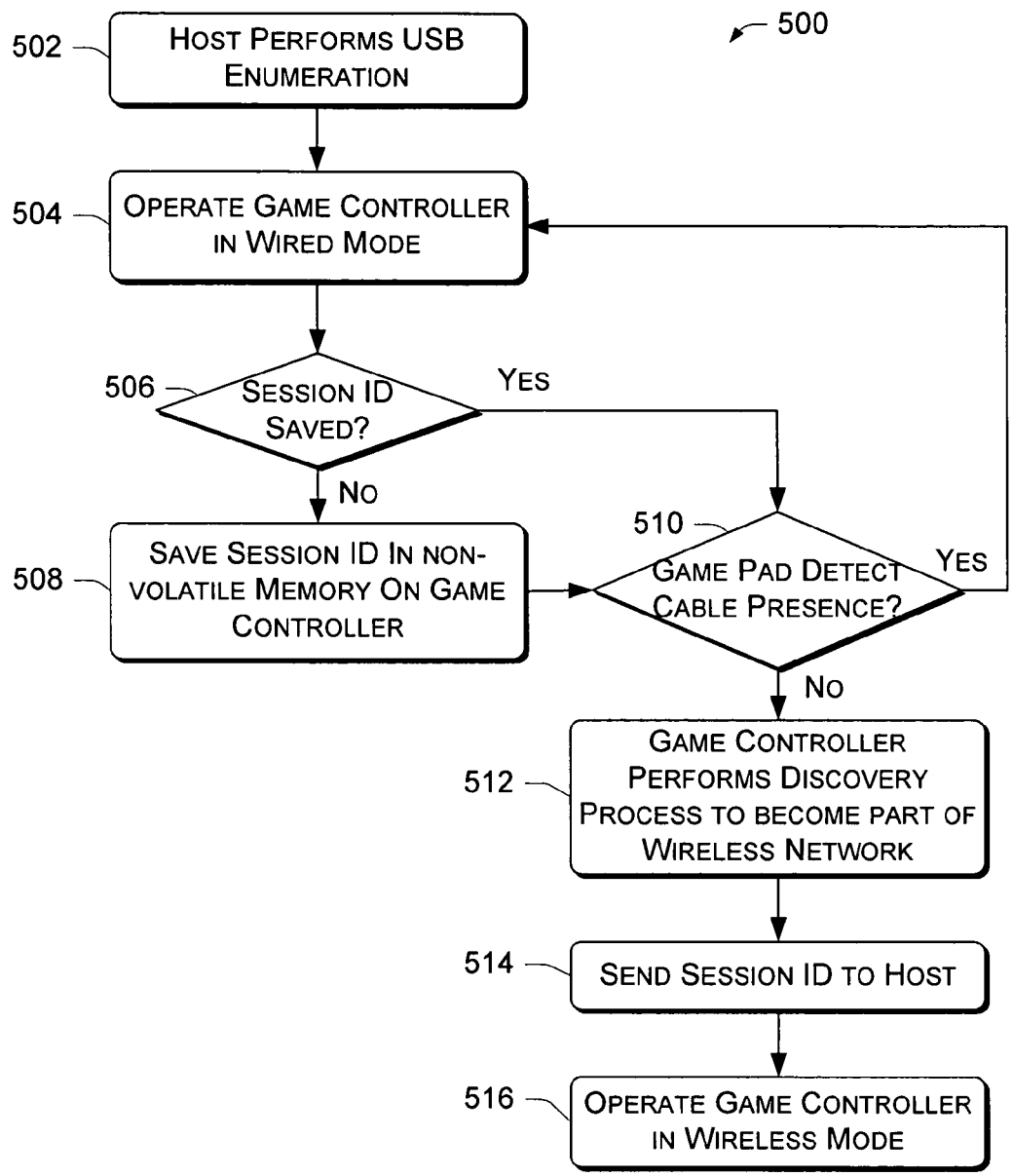
FIG. 5 is a flow diagram showing a process for converting use of the controller from wired operation to wireless operation.

FIG. 5 shows a process 500 for switching a game controller from a wired mode of operation to a wireless mode of operation. The process includes operations performed by both the game controller and a host gaming system, and once again will be described with reference to the controller 104 and game console 102 described above with respect to FIGS. 1-3.

At block 502, the host (e.g., game console 102) performs USB enumeration to establish a USB connection with the game controller 104 via the cable 106. Once a connection is established, the game controller 104 is operated in the wired mode (block 504). At block 506, the game controller 104 determines whether the session ID is saved in controller memory. If the session ID is not saved (i.e., the "No" branch from block 506), the game controller 104 saves the session ID in nonvolatile memory, such as EEPROM 308 (block 508).

Once the session ID is saved on the controller, the game controller 104 determines whether the cable 106 remains connected to one of the physical slots 114 of the game console (block 510). If it is still connected (i.e., the "Yes" branch from block 510), the game controller 104 continues to be operated in wired mode. When the cable is disconnected (i.e., the "No" branch from block 510), the game controller 104 performs a discovery process to become part of a wireless network and establish a wireless connection between the game controller and the game console (block 512).

Once a wireless connection is established, the game controller 104 retrieves the session ID from its nonvolatile memory and sends it to the game console so that any on-going game data can be reassociated with the controller (block 514). At block 516, the game controller 104 continues to operate in wireless mode.

The described mode switching processes 400 and 500 also accommodate the situation where a new player joins a game. A new player can connect his/her game controller to an available physical slot for wired operation or begin operation directly in wireless mode using the discovery process. The game console first attempts to match the session ID with a current list of session IDs. When a match is not found, the game console associate that device ID with the physical or virtual slot through which it communicates. It can then begin storing game data in relation to that device ID.

CONCLUSION

The above-described game controller facilitates both wired and wireless operation and the ability to switch between wired and wireless operation without interrupting an ongoing game. Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A video game controller comprising:
   a processor;
   a memory coupled to the processor;
   a first module to support communication over a cable for wired operation;
   a second module to support communication over a wireless link for wireless operation;
   a battery to supply power to the processor, the memory, and the second module when the video game controller is in wireless operation; and
   a power management module to maintain battery life data to be communicated to a host game system, the battery life data including:
     a total life expectancy of the battery;
     power used during wireless operation; and
     an amount of time left before battery supply is depleted;
   wherein the memory stores an identity of the video game controller; and
   when transitioning between the first and second modules in order to support communication, the video game controller passes the identity to the host game system for use in maintaining an association between the video game controller and game data of a video game currently being played to facilitate continued play of the video game, wherein the video game controller and the game data are associated with one another both before and after the transition.

2. A video game controller as recited in claim 1, wherein the second module comprises an RF module to support RF communication.

3. A video game controller as recited in claim 1, further comprising charging circuitry to charge the battery when the video game controller is in wired operation.

4. A video game controller as recited in claim 1, wherein the host name system comprises one of a game console or a personal computer.

5. A video game controller as recited in claim 1, comprising:
   a serial cable to connect the host game system; and
   a wireless interface to communicate with the host game system when the cable is detached from the host game system.

6. A method implemented by a host game system comprising:
   during play of a video game, receiving an identifier associated with a video game controller;
   associating the identifier with game data of the video game, wherein the game data of the video game is specific to the video game controller;
   detecting when conditions of the video name controller suggest switching from a wireless mode of operation to a wired mode of operation based on monitoring maintenance of battery life data, the battery life data including:
     a total life expectancy of a battery;
     power used during the wireless mode of operation; and
     an amount of time left before battery supply is depleted;
   conveying a low power indication based on the suggestion;
   switching the video game controller from the wireless mode of operation to the wired mode of operation; and
   continuing to facilitate uninterrupted play of the video game by communicating with the video game controller via the wired mode of operation, such that the identifier, which is associated with the video game controller and which is also associated with the game data of the video game that is specific to the video game controller, is used to maintain the association between the game data and the video game controller while the video game controller transitions from the wireless mode of operation to the wired mode of operation.

7. For use with a video game system, a storage medium having instructions that, when executed on the video game system, performs acts comprising:
  receiving instructions for controlling a video game from one of a plurality of video game controllers, the instructions being transmitted over a cable in a wired mode of operation and the instructions being transmitted over a wireless link in a wireless mode of operation;
  storing game data for the video game in association with an identity of each of the plurality of video game controllers, the game data being associated with a particular one of the plurality of video game controllers representing a particular game entity controlled by the particular one of the plurality of video game controllers;
  detecting when conditions of the particular one of the plurality of video game controllers suggest switching from the wireless mode of operation to the wired mode of operation based on monitoring maintenance of battery life data, the battery life data including:
    a total life expectancy of a battery;
    power used during the wireless mode of operation; and
    an amount of time left before battery supply is depleted;
  conveying a low power indication;
  facilitating transition from the wireless mode of operation to the wired mode of operation; and
  using the identity of the particular one of the plurality of video game controllers to switch from the wireless mode of operation the wired mode of operation to reassociate the game data, enabling ongoing play of the video game.

8. A storage medium as recited in claim 7, wherein the detecting comprises sensing when the cable is disconnected from the video game system.

* * * * *

UNITED STATES PATENT AND TRADEMARK OFFICE
CERTIFICATE OF CORRECTION

| | | |
|---|---|---|
| PATENT NO. | : 7,753,788 B2 | |
| APPLICATION NO. | : 10/769431 | |
| DATED | : July 13, 2010 | |
| INVENTOR(S) | : Richard S. Lum et al. | |

It is certified that error appears in the above-identified patent and that said Letters Patent is hereby corrected as shown below:

In column 8, line 40, in Claim 4, delete "name" and insert -- game --, therefor.

In column 8, line 55, in Claim 6, delete "name" and insert -- game --, therefor.

In column 8, line 62, in Claim 6, delete "conveving" and insert -- conveying --, therefor.

Signed and Sealed this
Twenty-fourth Day of May, 2011

David J. Kappos
*Director of the United States Patent and Trademark Office*